July 9, 1929.　　　　F. FISCHER　　　　1,720,591
CIRCUIT CLOSER
Filed May 16, 1927　　　2 Sheets-Sheet 1

INVENTOR.
Fenix Fischer,
BY Geo. P. Kimmel
ATTORNEY.

July 9, 1929.  F. FISCHER  1,720,591
CIRCUIT CLOSER
Filed May 16, 1927   2 Sheets-Sheet 2

INVENTOR.
Fenix Fischer,
BY
Geo. F. Kimmel
ATTORNEY.

Patented July 9, 1929.

1,720,591

UNITED STATES PATENT OFFICE.

FENIX FISCHER, OF SHEBOYGAN, WISCONSIN.

CIRCUIT CLOSER.

Application filed May 16, 1927. Serial No. 191,785.

This invention relates to a light projecting attachment for automobiles, and has for its object to provide in a manner as hereinafter set forth a circuit closing attachment for the projecting of light rays from an illuminable source around curves when an automobile is turning under such conditions reducing accidents to a minimum.

A further object of the invention is to provide, in a manner as hereinafter set forth, a light projecting attachment for automobiles operated from the steering mechanism thereof for projecting light rays around curves when the automobile is steered in such direction.

A further object of the invention is to provide, in a manner as hereinafter set forth, a light projecting attachment for automobiles automatically operated from the steering mechanism thereof for the purpose of projecting light rays around right or left curves when the vehicle is traveling in such direction.

A further object of the invention is to provide, in a manner as hereinafter set forth, a light projecting attachment for automobiles independent of the head lights of the latter and further automatically operated from the steering mechanism of the vehicle or automobile for projecting light rays in the direction of travel of the automobile when the latter is steered to the right or to the left.

Further objects of the invention are to provide, in a manner as hereinafter set forth, a light projecting attachment for automobiles for the purpose referred to, which is simple in its construction and arrangement, strong, durable, compact, thoroughly efficient in its use, automatically operated for light projecting purposes, readily installed with respect to the automobile and comparatively inexpensive to set up.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1:
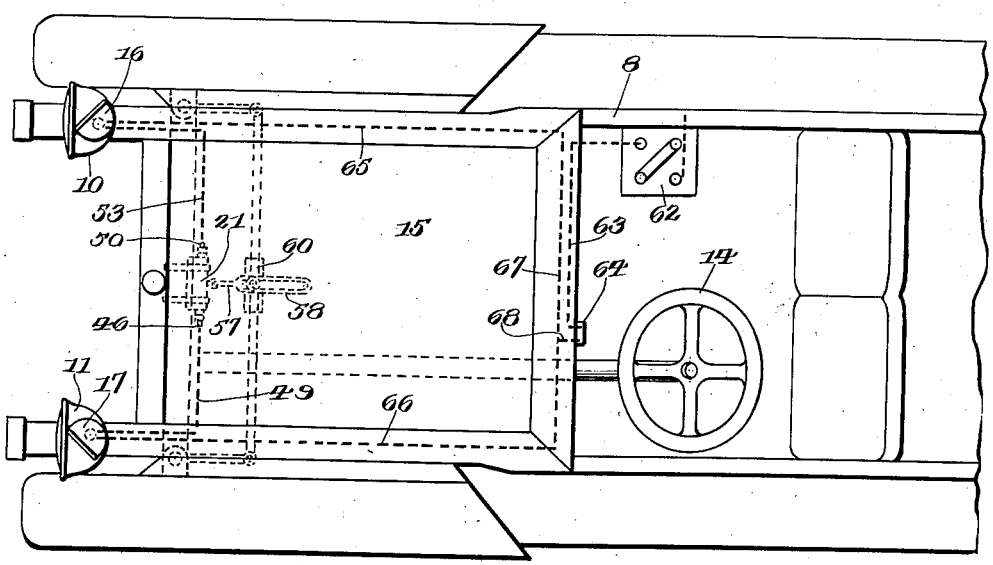
Figure 1 is a fragmentary view in plan, of an automobile showing the adaptation therewith of a light projecting attachment in accordance with this invention.
Figure 2:
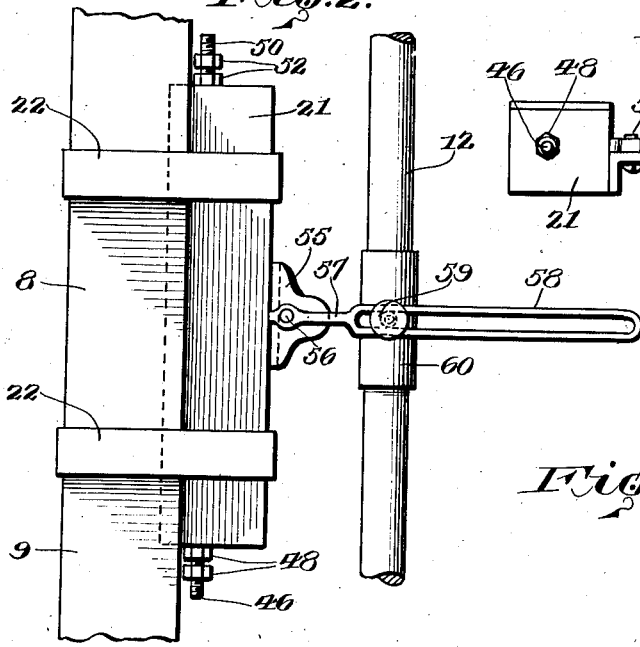
Figure 2 is a fragmentary view of an automobile, showing the adaptation with the front axle and connecting rod of the steering mechanism of an attachment in accordance with this invention.
Figure 3:
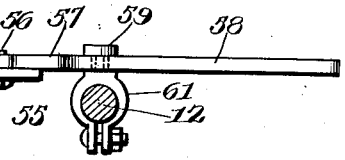
Figure 3 is a side elevation of the attachment coupled to the connecting rod of the steering mechanism of the vehicle.

Referring to the drawings in detail 8 indicates the body of an automobile, 9 the front axle thereof, 10, 11 the head lights, 12 the connecting rod of the steering mechanism, 13 the steering post, 14 the steering wheel and 15 the engine head.

Figure 4:
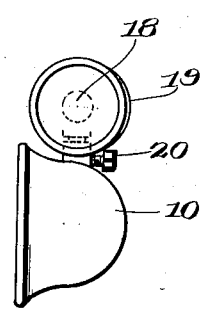
Figure 4 is a side elevation of the headlight of a motor vehicle or automobile showing the adaptation therewith of a light projecting element forming a part of the attachment in accordance with this invention.
Figure 5:
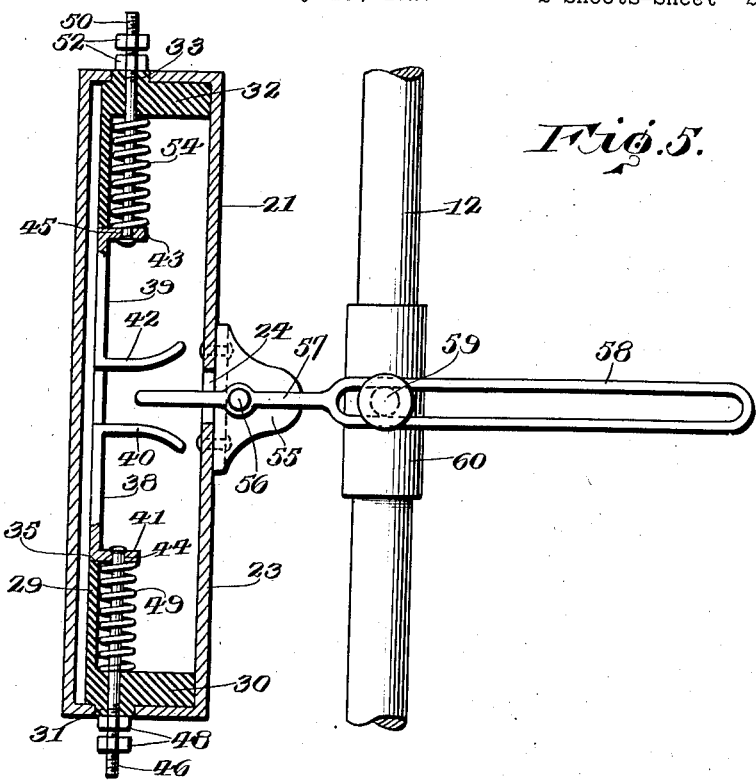
Figure 5 is a fragmentary view in sectional plan of the attachment and showing the same coupled with the connecting rod of the steering mechanism of the automobile.
Figure 6:
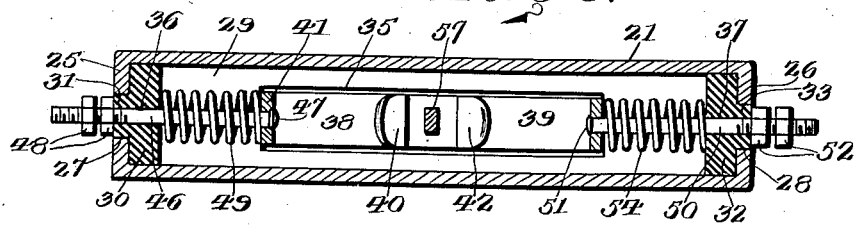
Figure 6 is a longitudinal sectional view illustrating the housing for the terminal contacts and with these latter illustrated with respect to the housing.
Figure 7:
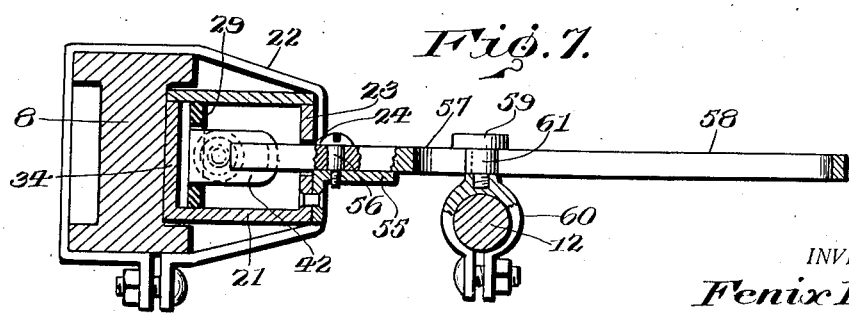
Figure 7 is a cross sectional view of the attachment showing the same connected to the front axle of the automobile.

A light projecting attachment, in accordance with this invention includes a pair of angularly disposed light ray projecting elements 16, 17 mounted respectively on the head lights 10, 11. The elements 16, 17 are oppositely disposed with respect to each other. The element 16 projects the light rays to the right and the element 17 to the left. Each of said elements comprises a lamp 18 and a globular reflector 19. With reference to Figure 4 a coupling device 20 is illustrated which is employed for connecting an element 16 or 17 to a head light 10 or 11.

The attachment includes a housing or casing 21 which is clamped with the front axle 9, and the housing 21 can be secured to the axle 9 in any desired position with respect thereto, but as shown the housing 21 is clamped against the rear side of the axle 9 and projects rearwardly therefrom. Two clamping members 22 are employed for fixedly securing the housing 21 to the front axle 8. Any form of clamp suitable for securing the housing 21 in position can be employed. The housing 21 can be constructed in any suitable manner so that access can be had thereto when desired. The housing 21 can also be constructed of any suitable material, but preferably metallic material should be employed. The rear wall of the housing 21, such wall being indicated at 23, is provided centrally thereof with a lengthwise extending slot 24. The end walls of the housing 21 are indicated at 25, 26 and are provided with openings 27, 28 respectively. Arranged within the housing 21 is a supporting member formed throughout of insulation and which consists of a body member 29 formed at each end with a right angularly disposed extension having an offset. One of the extensions is indicated at 30 and its offset at 31 and the other of the extensions is indicated at 32 and its offset at 33. The offsets 31 and 32 correspond in contour to the shape of the openings 27, 28. The supporting member 29 opposes the forward wall 34 of the housing 21, but is spaced therefrom. The extension 30 abuts against the inner face of the end wall 25 and extension 32 abuts against the inner face of the end wall 26. The offset 31 extends into the opening 27 and the offset 33 extends into the opening 28. The offsets 31 and 33 are flush with the outer faces of the end walls 25, 26 respectively. The extensions 30 and 32 also abut against the top and bottom walls of the housing 21 and against the inner face of the rear wall 23. The supporting member formed by the body 29 and extensions 30, 32 is constructed of any suitable insulation material. The body member 29 is formed with a lengthwise extending rectangular slot 35 having its ends spaced equi-distant from the extensions 30, 32 and each of said extensions is formed with an opening which extends through its offset. The opening in the extension 30 is indicated at 36 and that formed in the extension 32 at 37.

Positioned within the slot 35 is a pair of oppositely disposed contact members 38, 39 and each of which is of yoke shaped contour but has its inner arm of greater length than its outer arm. The inner arm of the member 38 is indicated at 40 and its outer arm at 41. The inner arm of the member 39 is indicated at 42 and its outer arm at 43. The inner arms 40, 42 have their outer portions curving outwardly. The arms 40, 42 are oppositely disposed with respect to each other. The arms 40, 42 extend in a direction away from the ends of the slot 24 and the latter is positioned centrally with respect to the space formed between said arms 40, 42. The arm 41 is provided with an opening 44 and the arm 43 with an opening 45. Extending through the arm 41 and opening 36 as well as projecting from the end wall 25 of the housing 21, is a binding post 46, having a head 47 at its inner end which is countersunk in the arm 41. The post 46 is threaded at its outer portion and mounted thereon, exteriorly of the end wall 25, are binding nuts 48 for a circuit connection 49 which leads to the projecting element 17. Surrounding the post 46 and interposed between the extension 30 and the arm 41 is a coiled spring 49. Extending through the arm 43 and opening 37 is a binding post 50 having a head 51 at its inner end countersunk in the arm 43. The outer portion of the post 50 is threaded and mounted thereon are binding nuts 52 for a circuit connection 53 which leads to the projecting element 16. Interposed between the arm 43 and the extension 32 and mounted on the post 50 is a coiled spring 54.

Secured to the outer face of the rear wall 23, centrally thereof and below the slot 24 is a bracket 55 carrying a pivot 56 for a circuit opening and closing element 57, which extends through the slot 24 and is positioned between the arms 40, 42 and normally spaced therefrom. Formed integral with the outer end of the element 57 and extending rearwardly therefrom is a lengthwise slotted arm 58 of appropriate length and which is operatively connected with the rod 12 to provide for the shifting of the element 57 to engage an arm 40 or 42 for closing the circuit for the element 17 or 16 respectively. The arm 58 is slidably connected by a headed pin 59, carried by a clamp 60 which is secured to the connecting rod 12. The arm 58 is of the desired length to provide for different positions of the connecting rod 12. The pin 59 is provided with a roller 61.

A battery is indicated at 62 and a circuit connection 63, leads therefrom to a switch 64, extending from the elements 16, 17 are circuit connections 65, 66 respectively and which are connected together by a circuit connection 67 and leading from the latter to the switch is a circuit connection 68. The circuit opening and closing element 57 in connection with the arm 58, provides a negative or ground connection. The switch 64 is employed for turning off the attachment when desired.

Although the elements 16 and 17 are shown mounted upon head lights 10, 11 respectively, they may be placed on the fenders or on the dash. The lamps forming part of the elements 16, 17 are of the double contact insulated type. The elements 16, 17 are disposed at an angle of approximately fifty degrees and retained permanently in such position.

The construction and arrangement of the attachment, is such that on the shift of the rod 12 in either direction the circuit opening and closing element 57 will be carried therewith and engage one of the arms 40 or 42, under such conditions closing the circuit to a projecting element 16 or 17 and on the turn of the car the light rays will be projected from an element 16 or 17 around the curve or in the direction in which the car is travelling around the curve. This arrangement for illuminating curves of a roadway over which an automobile is travelling will materially reduce accidents to a minimum, as the operator of the automobile can ascertain or rather see any obstructions on the turn and any on-coming automobile will be able to note that an automobile is rounding the curve or turn and the driver of the on-coming car will govern himself accordingly. Therefore it is thought the many advantages of a light projecting attachment for automobiles, in accordance with this invention can be readily understood, and although the preferred embodiment of the invention is as illustrated and described, yet it is to be understood that changes in the details of construction can be had which will fall within the scope of the invention as claimed.

What I claim is:

1. In a light projecting attachment for automobiles, a pair of binding posts each adapted to form an element in a normally open circuit of a light projecting means, a pair of spaced, endwise opposed yoke-shaped contact members, each standing on a longitudinal edge, having the arms thereof rearwardly directed and further having its outer arm electrically connected to the inner end of one of the binding posts, means for selective engagement with the inner arms of said yoke for closing a circuit for one of the light projecting means, and a support of insulation slidably supporting the body of said members and said posts.

2. In a light projecting attachment for automobiles, a pair of binding posts each adapted to form an element in a normally open circuit of a light projecting means, a pair of spaced, endwise opposed yoke-shaped contact members, each standing on a longitudinal edge, having the arms thereof rearwardly directed and further having its outer arm electrically connected to the inner end of one of the binding posts, means for selective engagement with the inner arms of said yokes for closing a circuit for one of the light projecting means, a support of insulation for slidably supporting the body of said members and said posts, and coiled springs carried by said binding posts and interposed between the outer arms of said yokes and the ends of said supports.

3. In a light projecting attachment for automobiles, a pair of binding posts each adapted to form an element in a normally open circuit of a light projecting means, a pair of spaced, endwise opposed yoke-shaped contact members, each standing on a longitudinal edge, having the arms thereof rearwardly directed and further having its outer arm electrically connected to the inner end of one of the binding posts, means for selective engagement with the inner arms of said yokes for closing a circuit for one of the light projecting means, a support of insulation for slidably supporting the body of said members and said posts, coiled springs carried by said binding posts and interposed between the outer arms of said yokes and the ends of said support, and a casing for said support, said support extending into the ends of said casing, and said casing having an opening for the extension therein of a means for selective engagement with the inner arms of said yokes.

4. In a light projecting attachment for automobiles, a pair of slidable binding posts each adapted to form an element in a normally open circuit of a light projecting means, a pair of spaced, endwise slidable opposed yoke-shaped contact members, each standing on a longitudinal edge, having the arms thereof rearwardly directed and further having its outer arm electrically connected to the inner end of one of the binding posts, means for selective engagement with the inner arms of said yoke for closing a circuit for one of the light projecting means, and the said inner arms of said yokes being of greater length than the outer arms thereof and flaring outwardly relatively to each other.

5. In a light projecting attachment for automobiles a pair of slidable binding posts each adapted to form an element in a normally open circuit of a light projecting means, a pair of spaced, endwise slidable opposed yoke-shaped contact members, each standing on a longitudinal edge, having the arms thereof rearwardly directed and further having its outer arm electrically connected to the inner end of one of the binding posts, a pivoted circuit opening and closing member common to said contact members and selectively engaging with the inner arms of said members for closing the circuit for one of the light projecting means, a slotted arm extended from and integral with the rear end of said circuit opening and closing member and having the slot therein extending lengthwise thereof, and a portable roller having sliding contact with the side walls of said slot for shifting said circuit opening and closing member.

6. In a light projecting attachment for automobiles a pair of slidable binding posts each adapted to form an element in a normally open circuit of a light projecting means, a pair of spaced, endwise slidable opposed yoke-shaped contact members, each standing on a longitudinal edge, having the arms thereof rearwardly directed and further having its outer arm electrically connected to the inner end of one of the binding posts, a pivoted circuit opening and closing member common to said contact members and selectively engaging with the inner arms of said members for closing the circuit for one of the light projecting means, a slotted arm extended from and integral with the rear end of said circuit opening and closing member and having the slot therein extending lengthwise thereof, a portable roller having sliding contact with the side walls of said slot for shifting said circuit opening and closing member, and a support of insulation for slidably supporting said contact members and said binding posts.

7. In a light projecting attachment for automobiles a pair of slidable binding posts each adapted to form an element in a normally open circuit of a light projecting means, a pair of spaced, endwise slidable opposed yoke-shaped contact members each standing on a longitudinal edge, having the arms thereof rearwardly directed and further having its outer arm electrically connected to the inner end of one of the binding posts, a pivoted circuit opening and closing member common to said contact members and selectively engaging with the inner arms of said members for closing the circuit for one of the light projecting means, a slotted arm extended from and integral with the rear end of said circuit opening and closing member and having the slot therein extending lengthwise thereof, a portable roller having sliding contact with the side walls of said slot for shifting said circuit opening and closing member, a support of insulation for slidably supporting said contact members and said binding posts, and coiled springs carried by said binding posts and interposed between said outer arms and the ends of said supports.

8. In a light projecting attachment for automobiles, a pair of binding posts each adapted to form an element in a normally open circuit of a light projecting means, a pair of spaced, endwise opposed yoke-shaped contact members, each standing on a longitudinal edge and having the arms thereof rearwardly directed and further having an outer arm electrically connected to the inner end of one of the binding posts, means for selective engagement with the inner arms of said yoke for closing a circuit for one of the light projecting means, and a yoke-shaped support of insulation for said members and said posts, said members slidably seated in the body of said support, said posts slidably extending through the arms of said support.

9. In a light projecting attachment for automobiles, a pair of slidable binding posts each adapted to form an element in a normally open circuit of a light projecting means, a pair of spaced, endwise slidable opposed yoke-shaped contact members, each standing on a longitudinal edge and having the arms thereof rearwardly directed and further having an outer arm electrically connected to the inner end of one of the binding posts, means for selective engagement with the inner arms of said yoke for closing a circuit for one of the light projecting means, a yoke-shaped support of insulation for slidably supporting said members and said posts, said members slidably seated in the body of said support, said posts slidably extending through the arms of said support, and coiled springs mounted on said binding posts and interposed between the outer arms of said members and the arms of said support.

10. In a light projecting attachment for automobiles, a pair of binding posts each adapted to form an element in a normally open circuit of a light projecting means, a pair of spaced, endwise opposed yoke-shaped contact members, each standing on a longitudinal edge and having the arms thereof rearwardly directed and further having an outer arm electrically connected to the inner end of one of the binding posts, means for selective engagement with the inner arms of said yoke for closing a circuit for one of the light projecting means, a yoke-shaped support of insulation for said members and said posts, said members slidably seated on the body of said support, said posts slidably extending through the arms of said support, coiled springs mounted on said binding posts and interposed between the outer arms of said members and the arms of said support, and the inner arms of said members being of greater length than the outer arms thereof and curving outwardly relatively to each other.

In testimony whereof, I affix my signature hereto.

FENIX FISCHER.